(12) United States Patent
Takanashi et al.

(10) Patent No.: US 6,345,815 B1
(45) Date of Patent: Feb. 12, 2002

(54) ELECTRIC HAND

(75) Inventors: Seiji Takanashi; Hiroshi Miyachi; Koichiro Kanda, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/664,851

(22) Filed: Sep. 19, 2000

(30) Foreign Application Priority Data

Oct. 15, 1999 (JP) .......................................... 11-293731

(51) Int. Cl.⁷ ................................................ B25B 1/06
(52) U.S. Cl. ........................ 269/224; 269/238; 269/240
(58) Field of Search .......................... 269/34, 238, 240, 269/246, 224

(56) References Cited

U.S. PATENT DOCUMENTS

| | | | | |
|---|---|---|---|---|
| 3,580,459 A | * | 5/1971 | Gage | 269/242 |
| 3,704,879 A | * | 12/1972 | Nishikawa | 269/240 |
| 4,484,775 A | * | 11/1984 | Norkus | 269/238 |
| 4,672,859 A | * | 6/1987 | Vatzov et al. | 269/60 |
| 4,676,492 A | * | 6/1987 | Shamir | 269/73 |
| 4,871,154 A | * | 10/1989 | Seney | 269/246 |
| 4,971,301 A | * | 11/1990 | Yang | 269/247 |

* cited by examiner

*Primary Examiner*—Robert C. Watson
(74) *Attorney, Agent, or Firm*—Oblon, Spivak, McClelland, Maier & Neustadt, P.C.

(57) ABSTRACT

A spring or springs are provided between driving-side members that operate together with an output shaft of a stepping motor, and driven-side members that operate together with a jaw member. Thereby, when the jaw members performs opening motion, the driving-side members and the driven-side member directly engage with each other, thereby allowing a driving force to be transmitted directly from the output shaft to the jaw members. When the jaw members performs workpiece-holding operation, the driving-side members and the driven-side member engage each other via the spring or springs, thereby allowing the driving force to be elastically transmitted from the output shaft to the jaw members via the spring or the springs. In this configuration, when the workpiece-holding operation is performed by the jaw members, the stepping motor is controlled so as to over-rotate in a buffered manner.

8 Claims, 7 Drawing Sheets

ELECTRIC HAND

TECHNICAL FIELD

The present invention relates to an electric hand that uses an electric motor to perform opening/closing motion of jaw members that performs workpiece-holding operation, and particularly to an electric hand using a stepping motor.

1. Prior Art

As hands for holding various workpieces for processing, transporting, and the like, electric hands that use an electric motor to perform opening/closing motion of jaw members are known. The electric hand performs opening/closing control step-by-step at very small pitches for the jaw members according to the number of driving pulses, thereby allowing the jaw members to perform the opening/closing motion corresponding to the size of an object to be held.

With the stepping motor being used, an arrangement must be made such that the opening width of the jaw members that is set according to the number of the driving pulses agrees with the width of a portion of a workpiece that is held. Alternatively, an arrangement must be made such that the number of the driving pulses is slightly increased to make the holding width of the jaw members to be somewhat smaller than the width of a workpiece. Then, the electric hand must perform the holding motion by allowing workpiece-holding attachments provided on the jaw members to flexibly bend.

However, the sizes of workpieces are not constant. Therefore, the number of the pulses for driving the motor must be adjusted according to the sizes of the workpieces. Practically, however, such adjustment for various workpieces is difficult. Also, either in a case where the object-holding attachments provided on the jaw members do not flex or in a case where the jaw members perform the holding motion beyond the flexing range of the attachments, an out-of-synchronism phenomenon where the driving pulses are not kept in synchronism with the stepping motor occurs, and the electric hand thereby causes an operational defect.

2. Disclosure of the Invention

The present invention has been made to solve the above-described problems. Accordingly, an object of the invention is to provide an electric hand using a stepping motor, in which an operational defect due to out-of-synchronism in pulse is prevented, a holding width of jaw members that corresponds to the width of a workpiece is secured, and the workpiece can therefore be securely held.

To achieve the above, according to the present invention, an electric hand has a buffering mechanism for over-rotating a stepping motor in a buffered manner within a preset range of the number of pulses when a workpiece is held by a pair of jaw members.

The buffering mechanism has a driving-side member that operates together with an output shaft of the stepping motor, a driven-side member that operates together with the pair of jaw members, and spring means interposed between the driving-side member and the driven-side member. The driving-side member is directly engaged with the driven-side member to allow a driving force to be directly transmitted from the output shaft to jaw members when the jaw members are opened. The driving-side member is engaged with the driven-side member via the spring means to allow the driving force to be elastically transmitted from the output shaft to the jaw members via the spring means when the workpiece is held by the jaw members.

In the electric hand configured as described above, even after the jaw members hold the workpiece, the output shaft of the stepping motor can be elastically over-rotated. Therefore, by preliminarily setting the number of driving pulses for the stepping motor within a range permitting the aforementioned over-rotation, the workpiece can be securely held without causing an operational defect due to out-of-synchronism between the stepping motor and the driving pulses.

According to a specific aspect of the present invention, the aforementioned converting mechanism has a rotation shaft that is mounted on the output shaft of the stepping motor, a driving member that is screw-connected with the rotation shaft and that is linearly moved forward and backward along the axial direction according to reciprocating and rotating motion of the rotation shaft, and an opening/closing mechanism for converting linear movement transmitted from the driving member to the opening/closing motion of the pair of jaw members via a transmission shaft. In addition, the spring means is interposed between the driving member and the transmission shaft, so that the buffering mechanism is configured of the driving member, the transmission shaft, and the spring means.

More particularly, the aforementioned driving member has a hollow buffer housing on a distal end side, a proximal end portion of the transmission shaft is received in the buffer housing so as to be slidable by a specific distance, and the aforementioned spring means is interposed between a flange portion formed on the transmission shaft and the buffer housing.

According to another specific aspect of the invention, the aforementioned converting mechanism has a pinion fixed to the output shaft of the stepping motor, a pair of driving members having racks meshing with the pinion, and a pair of transmission members each interposed between each driving member and each jaw member for transmitting motion of each driving member to each jaw member to open/close the pair of jaw members. In this configuration, the aforementioned spring means is interposed between the pair of driving members and the pair of transmission members, so that the aforementioned buffering mechanism is formed of the driving members, the transmission members, and the spring means.

More particularly, the aforementioned transmission members are respectively received in the driving members that are cylindrical so as to be slidable by a specific distance and are connected to the jaw members via driving pins extending from the transmission members, and the spring means is interposed between the transmission members and the driving members so as to elastically urge the transmission members in the direction for holding operation.

According to still another specific aspect of the invention, the aforementioned converting mechanism has a rotation member mounted on the output shaft of the stepping motor; a cam member mounted on the rotation member; a pair of cam grooves that are shaped substantially to be semicircular and that are formed in the cam member; and driving pins that are respectively fixed on the pair of jaw members, that are individually fitted into the pair of cam grooves, and that slide in the cam grooves according to rotation of the cam member to open/close the jaw members. Also, the aforementioned rotation member has a base stand fixed to the output shaft, and a mounting stand assembled to the base portion so as to be rotatable relative to the base stand by a specific angle; the cam member is installed on the mounting stand, the spring means is interposed between the base portion and the mounting stand, and the buffering mechanism is configured of the base portion, the mounting stand, and the spring means.

More particularly the aforementioned base portion of the rotation member has a lever, the mounting stand has the spring means and a spring receiver, the lever directly abuts the mounting stand to allow a rotation force of the base portion to be directly transmitted to the mounting stand when the base portion rotates in one direction, and the lever abuts on the mounting stand via the spring receiver to allow the rotation force of the base portion to be elastically transmitted to the mounting stand via the spring means when the base portion rotates in the reverse direction.

DETAILED DESCRIPTION

Figure 1:
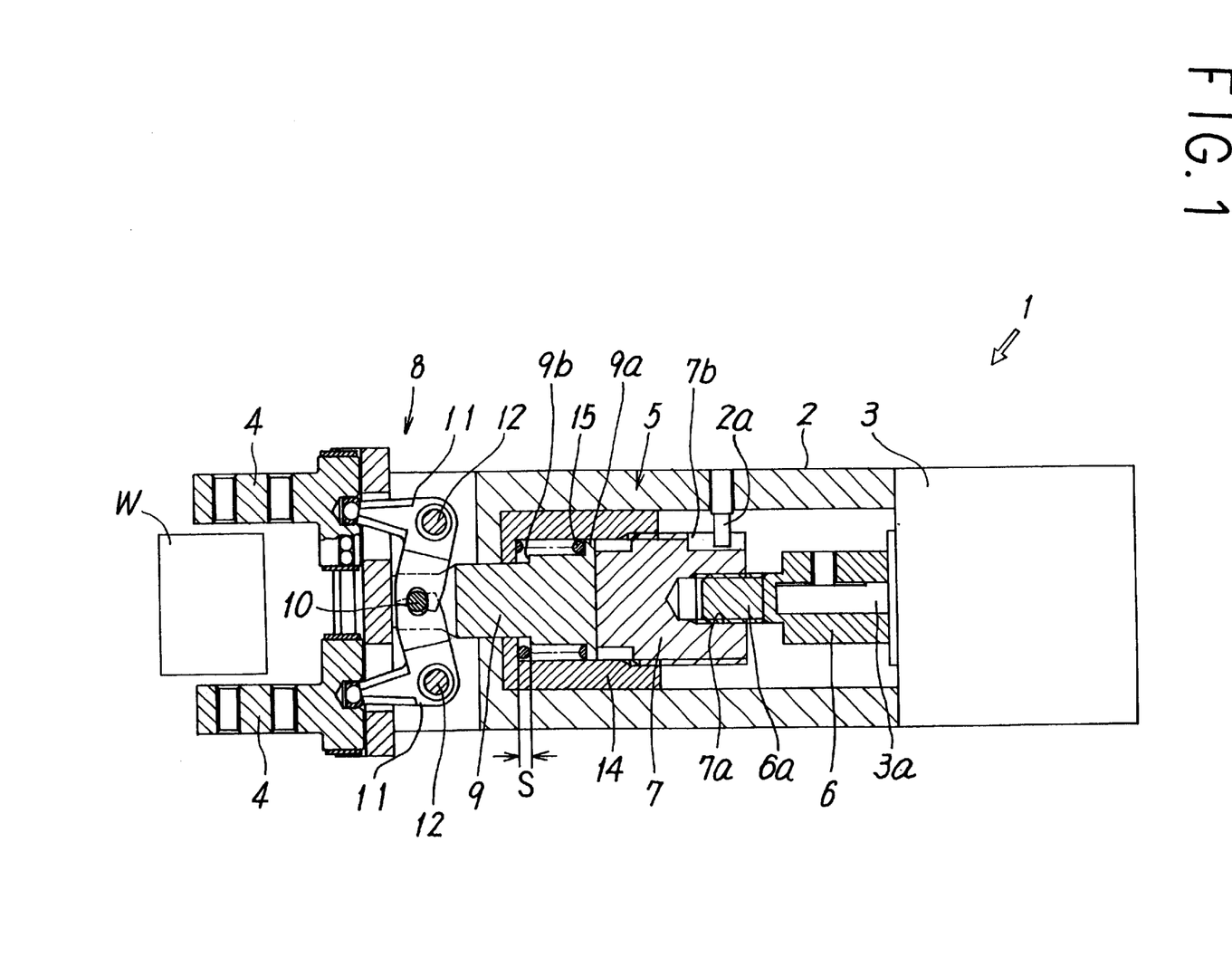
FIG. 1 is a cross-sectional view showing a configuration of an electric hand according to a first embodiment of the present invention.
Figure 2:
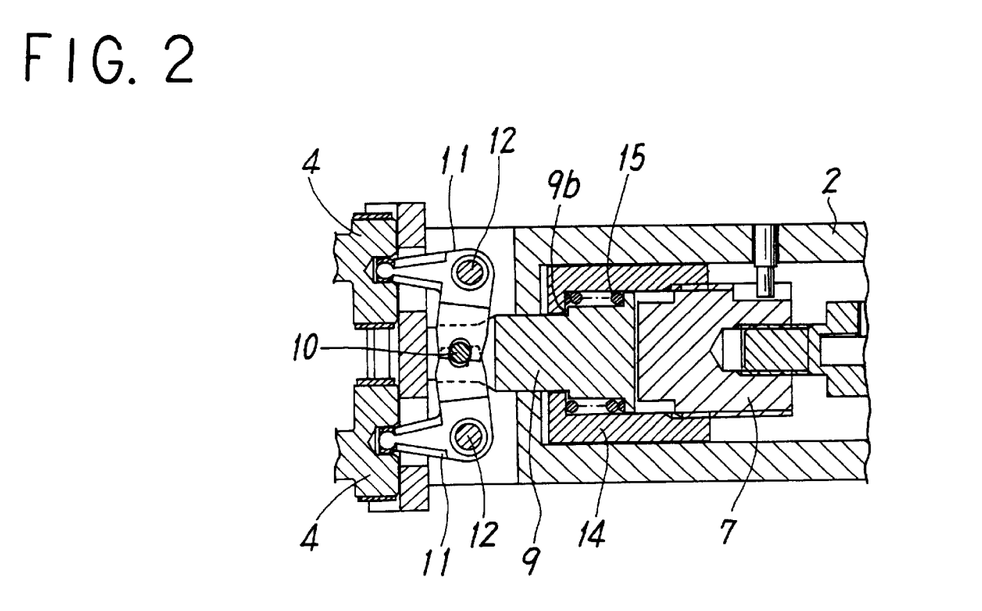
FIG. 2 is a main-portion cross-sectional view for explaining operation of the first embodiment.

FIGS. 1 and 2 show a first embodiment of the present invention. An electric hand 1 of the first embodiment has a reversibly rotatable stepping motor 3 provided on a hand main body 2, a pair of jaw members 4 which are opened/closed by driving of the stepping motor 3, and a converting mechanism 5 which converts the driving force of the stepping motor 3 to opening/closing motion of the jaw member 4, 4. The quantity of rotation of the stepping motor 3 is controlled according to the number of driving pulses. The pair of jaw member 4, 4 are supported to one end of the hand main body 2 through a guide and assembled such that they can be opened/closed in a direction perpendicular to an axial line of an output shaft 3a of the stepping motor 3.

The converting mechanism 5 housed in the hand main body 2 has a rotation shaft 6 which is mounted on a distal end portion of the output shaft 3a of the stepping motor 3, a screw portion 6a provided at a distal end portion of the rotation shaft 6, a driving member 7 which is screwconnected with the screw portion 6a through a screw hole 7a formed on a proximal end side, an opening/closing mechanism 8 which converts movement of the driving member 7 in the axial direction to the opening/closing motion of the pair of jaw members 4, and a transmission shaft 9 which is provided between the driving member 7 and the opening/closing mechanism 8 so as to transmit the driving force of the driving member 7 to the opening/closing mechanism 8.

The driving member 7 has a straight-guiding groove 7b extending in the axial direction thereof on its outer face. A rotation-preventing pin 2a provided in the hand main body 2 is inserted into the straight-guiding groove 7b so that the rotation of the driving member 7 is restricted. In the restricted state, when the rotation shaft 6 and the screw portion 6a rotate, the driving member 7 linearly moves forward and backward in the direction of the rotation shaft 6.

Also, the opening/closing mechanism 8 has a pair of levers 11 bent in an approximate L shape. Each of the levers 11 is supported by the hand main body 2 such that an intermediate bent portion of the lever 11 is rotatable through by a supporting pin 12. Also, the lever 11 has a proximal end portion that engages a driving pin 10 provided at a distal end of the transmission shaft 9, and has the other end engaging a corresponding jaw member 4. When the transmission shaft 9 moves rightward in the state shown in FIG. 1, the levers 11 individually rotate about the supporting pins 12 in the direction that their ends close to each other, thereby allowing the pair of jaw members 4 to hold a workpiece W therebetween.

On the other hand, the transmission shaft 9 is slidably housed in a buffer housing 14 which is screw-connected with a distal end portion of the driving member 7. The housing 14 is housed in the hand main body 2 so as to be slidable integrally with the driving member 7 in the axial direction. In the buffer housing 14, the transmission shaft 9 is urged by a spring 15 interposed between the buffer housing 14 and a flange portion 9a toward the driving member 7, that is, in the direction in which the pair of jaw members 4 performs the holding operation. In addition, the transmission shaft 9 has a stepped portion 9b which engaged with the buffer housing 14 at its forward end. According to the provision of the stepped portion 9b, the transmission shaft 9 is allowed to move in the axial direction within the buffer housing 14 by a distance S defined by the driving member 7.

When the transmission shaft 9, the driving member 7, and the buffer housing 14 integrally move to a forward portion shown in FIG. 1, the pair of jaw members 4 opens to release the workpiece W. Conversely, when the transmission shaft 9, the driving member 7, and the buffer housing 14 integrally move back, that is, in the right direction on FIG. 1, the jaw members 4 close to each other and holds the workpiece W therebetween. When the driving member 7 and the buffer housing 14 further move backward by a short distance, the spring 15 is thereby compressed, and an elastic force of the spring 15 causes a holding force.

Thus, a buffering mechanism which over-rotates the stepping motor 3 in a buffering manner within a preset range of the number of pulses when the workpiece W is held by the jaw members 4 is configured of the driving member 7 and the buffer housing 14 which are driving-side members, and which operate together with the output shaft 3a of the stepping motor 3, the transmission shaft 9 (which is a driven-side member) that operates together with the jaw members 4, and the spring 15 interposed therebetween.

In the first electric hand configured as described above, to cause the jaw members 4 to individually operate in opening directions, the stepping motor 3 is driven to rotate the rotation shaft 6 in a normal direction. Thereby, the driving member 7 screw-connected with the screw portion 6a of the rotation shaft 6 and the buffer housing 14 connected to the driving member 7 move forward in the axial direction up to the position shown in FIG. 1. Thereby, the transmission shaft 9 moves forward to rotate the pair of levers 11 in directions in which their edges open. FIG. 1 shows the state where the above operations are performed. In this case, since a driving limit of the stepping motor 3 is preliminarily set, a problem of out-of-synchronism pulses is not caused.

Conversely, to cause the jaw members 4 to individually operate in closing directions, the stepping motor 3 is driven in the reverse direction to rotate the rotation shaft 6 in the reverse direction. Thereby, the driving member 7 and the buffer housing 14 move backward, as shown in FIG. 2. Accordingly, the transmission shaft 9 moves backward to rotate the pair of levers 11 in directions in which their edges close. As a result, the jaw members 4 close, and the workpiece W is held therebetween. Even after the workpiece W is held, the driving member 7 and the buffer housing 14 are continually moved back by the stepping motor 3 by a short distance. However, the short backward movement is absorbed by compression of the spring 15, and a holding force of the jaw members 4 is generated.

In this way, when the jaw members 4 hold the workpiece W, although the transmission shaft 9 is not allowed to move back further, the spring 15 allows the driving member 7 and the buffer housing 14 to move back further by the predetermined distance S. Therefore, in the given range, the stepping motor 3 can run without causing a problem of out-of-synchronism in pulses. Thus, the workpiece W can be securely held without the operational defect being caused due to out-of-synchronism pulses by preliminarily setting the number of pulses for driving the stepping motor 3 such that the spring 15 can be compressed in the range of the distance S.

If the number of pulses for driving the stepping motor 3 exceeds the range of the distance S, the buffer housing 14 abuts on the stepped portion 9b of the transmission shaft 9. Therefore, the buffer housing 14 is blocked for movement, and an operational defects due to out-of-synchronism pulses is likely caused.

FIGS. 3 to 6 show a second embodiment of an electric hand according to the present invention. The electric hand 21 of the second embodiment has a stepping motor 23 is provided in a hand main body 22, a pair of jaw members 24 which performs a linear opening/closing motion, and a converting mechanism 25 of a rack-and-pinion type which converts a rotation force of an output shaft 23a of the stepping motor 23 to the opening/closing motion of the jaw members 24. The jaw members 24 are respectively supported movably by a pair of guides 24a arranged parallel to each other on the hand main body 22. Also, the jaw members 24 synchronously move in directions opposing each other along the guides 24a, thereby performing opening/closing motion in directions perpendicular to the axial line of the output shaft 23a.

Figure 3:
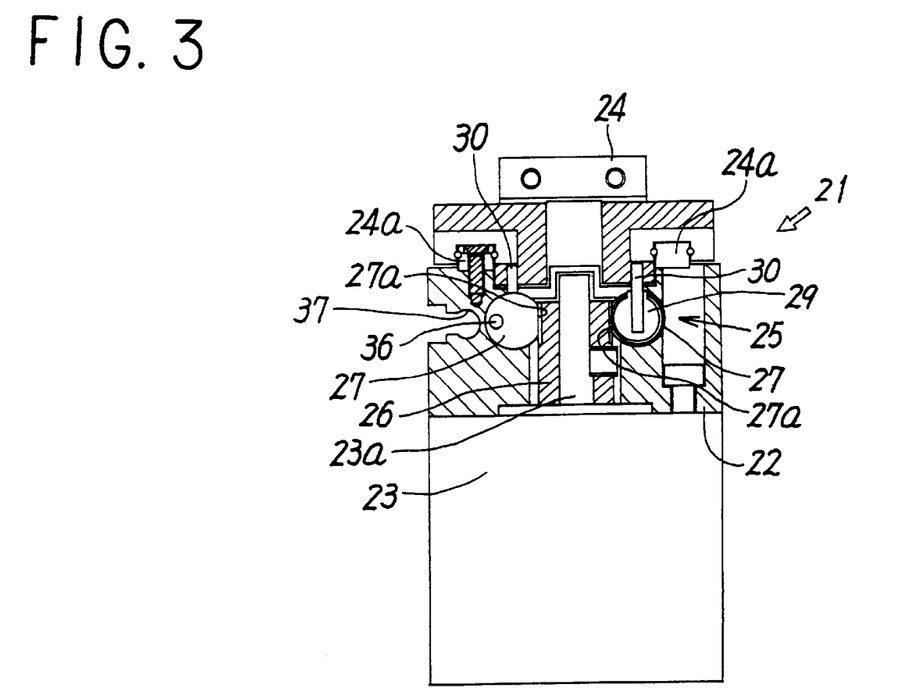
FIG. 3 is a cross-sectional view showing a configuration of an electric hand according to a second embodiment of the present invention.
Figure 4:
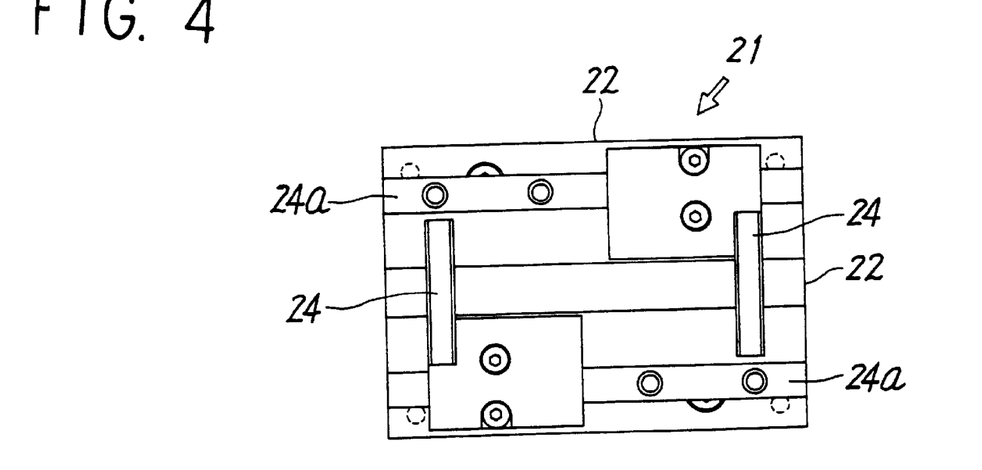
FIG. 4 is a plan view of the second embodiment.

In the hand main body 22, the converting mechanism 25 has a pinion 26 which is mounted on the output shaft 23a of the stepping motor 23, substantially cylindrical driving members 27 are arranged symmetrical with respect to the aforementioned pinion 26, racks 27a which are respectively formed on side faces of the driving members 27 and which are engaged with the pinion 26, and a pair of transmission members 29 which respectively connect the driving members 27 to the corresponding jaw members 24.

Figure 5:
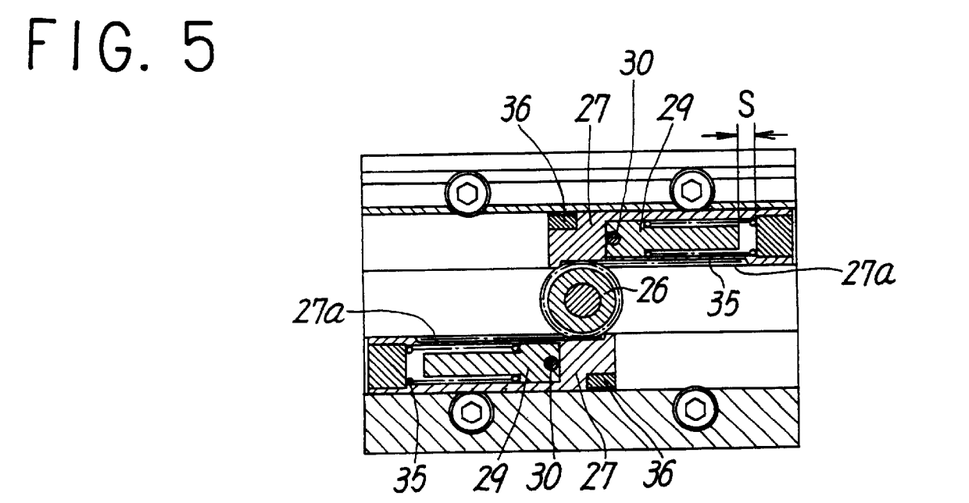
FIG. 5 is a cross-sectional view of the second embodiment in a state where jaw members are removed.
Figure 6:
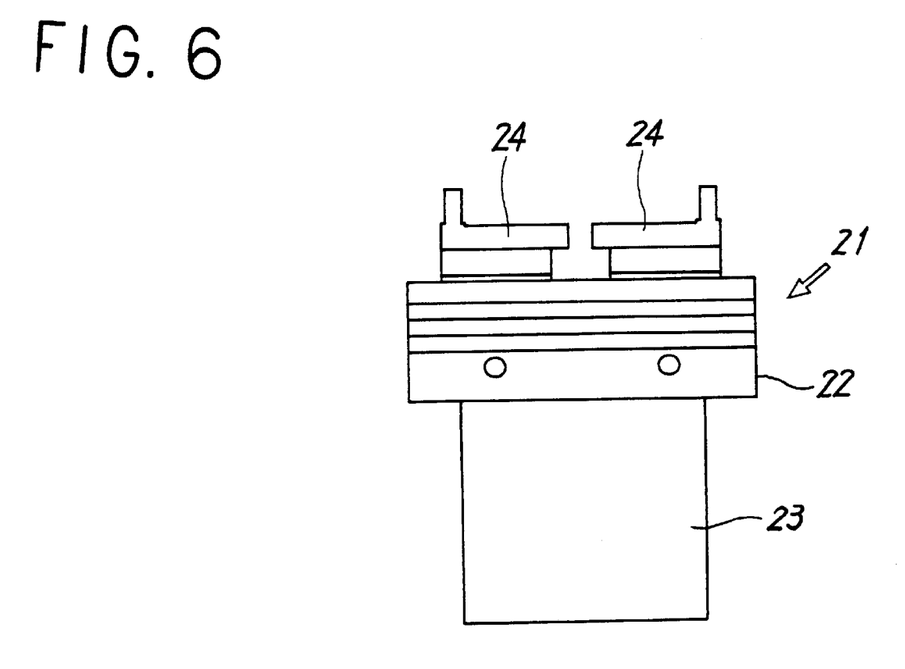
FIG. 6 is a front view of the second embodiment.

As clearly shown in FIG. 5, each transmission member 29 is slidably arranged in the corresponding driving member 27, and is connected to the corresponding jaw member 24 by engaging a driving pin 30 mounted on the transmission members 29 with the jaw members 24. The transmission member 29 and the driving member 27 are arranged at a specific spacing therebetween, thereby allowing the transmission member 29 to move by a predetermined distance S in directions in which the jaw members 24 perform the opening/closing motion. In addition, between the transmission member 29 and the driving member 27, there is interposed a spring 35 that generates an elastic force in a direction for urging the jaw members 24 to close.

Thus, in the second embodiment, a buffering mechanism is configured of the driving members 27 which are driving-side members and which operate together with the output shaft 23a, the transmission members 29 which are driven-side members and which operate together with the jaw members 24, and the springs 35 interposed therebetween.

In the figures, reference numeral 36 denotes position detecting magnets interposed the driving member 27, and numerals 37 denotes a mounting groove for a proximity switch that detects approach of the magnet 36.

In the electric hand of the second embodiment configured as described above, to cause the jaw members 24 to perform the opening motion, the stepping motor 23 is driven to rotate the pinion 26 in a forward direction. Thereby, the driving members 27 whose racks 27a mesh with the pinion 26 are moved away from each other to the positions shown in FIG. 5, so that the movement of the driving members 27 is transmitted to the respective jaw members 24 via the transmission members 29 and the driving pins 30. According to the above, the jaw members 24 perform the opening motion. In this case, by setting a driving limit of the stepping motor preliminarily, a problem of out-of-synchronism pulses is not caused.

On the other hand, to cause the jaw members 24 to perform the closing motion, the stepping motor 23 is driven to rotate the pinion 26 in the reverse direction. Thereby, the driving members 27 are moved so as to approach to each other. Since the transmission members 29 moves together with the driving members 27, the jaw members 24 respectively move in directions in which they are close to each other, and the workpiece W is held therebetween. Even after the workpiece W is held, the driving members 27 are moved by a short distance. However, the short movement is absorbed by compression of the spring 35, and a holding force of the jaw members 24 is generated according to an elastic force of the spring 35 compressed.

Also even in the second embodiment described above, when the jaw members 24 hold the workpiece W, although the transmission shaft 29 is not allowed to move back further, the spring 35 allows the driving member 27 to move back further by the predetermined distance S. Therefore, in the given range, the stepping motor 23 is allowed to run without out-of-synchronism with pulses. Thus, the workpiece W can be securely held without an operational defect being caused due to the out-of-synchronism with pulses by preliminarily setting the number of pulses for driving the stepping motor 23 such that the spring 35 can be compressed in the range of the distance S.

FIGS. 7 to 11 show a third embodiment of an electric hand according to the present invention. The electric hand 41 of the third embodiment has a stepping motor 43 which is provided in a hand main body 42, a pair of jaw members 44 which is driven in by the stepping motor 43, thereby performing the linear opening/closing motion, and a converting mechanism 45 of a cam type which converts a driving force of the stepping motor 43 to the opening/closing motion of the jaw members 44.

Figure 7:
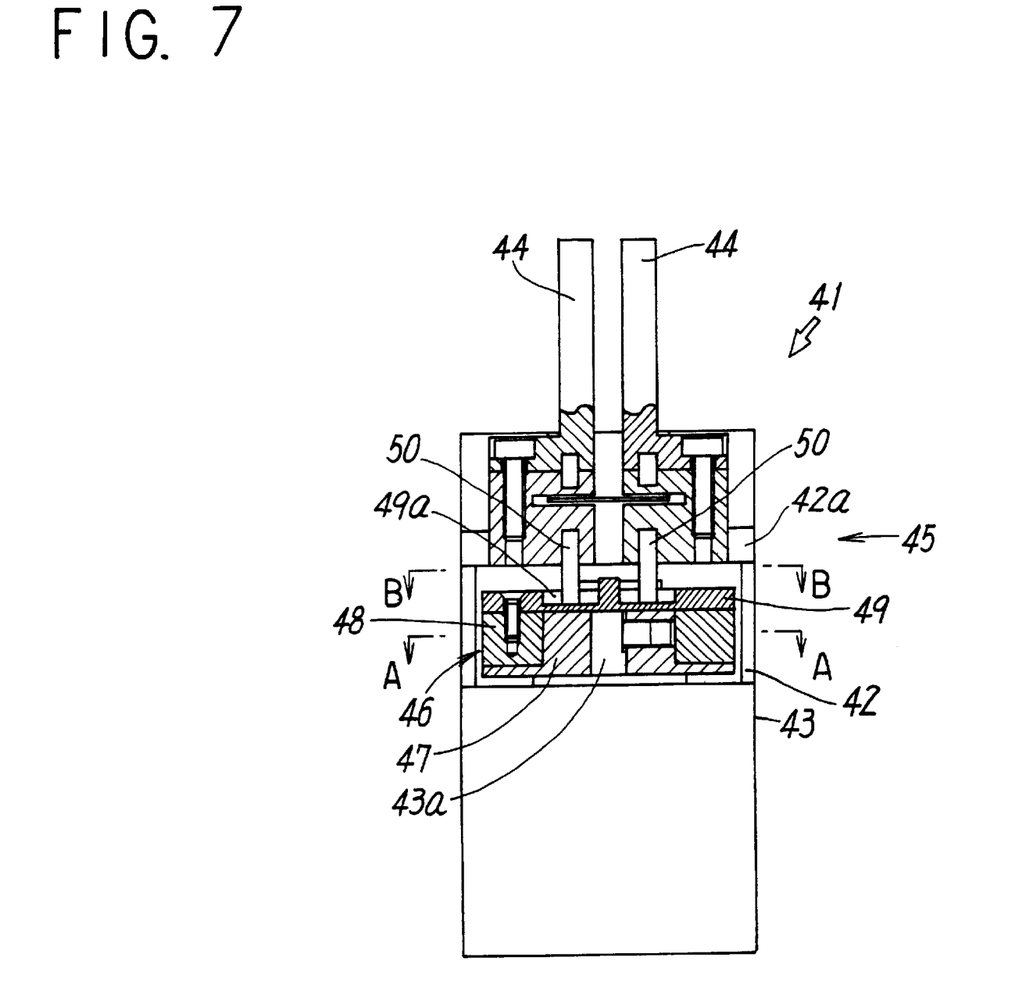
FIG. 7 is a cross-sectional view showing a configuration of an electric hand according to a third embodiment of the present invention.

The pair of jaw members 44 are respectively fitted slidably through their proximal end portions into guide grooves 42a with a T-shaped cross section which is provided in the hand main body 42. The jaw members 44 perform the opening/closing motion along the individual guide groove 42a.

Also, the converting mechanism 45 has a rotation member 46 which is mounted on an output shaft 43a of the stepping motor 43, a disk-like cam member 49 which is mounted on an upper face of the rotation member 46, cam grooves 49a which are formed symmetrical with respect the axial line on an upper face of the cam member 49, and driving pins 50 which are respectively mounted on lower faces of the individual jaw members 44 so as to engage with the cam grooves 49a.

Figure 10:
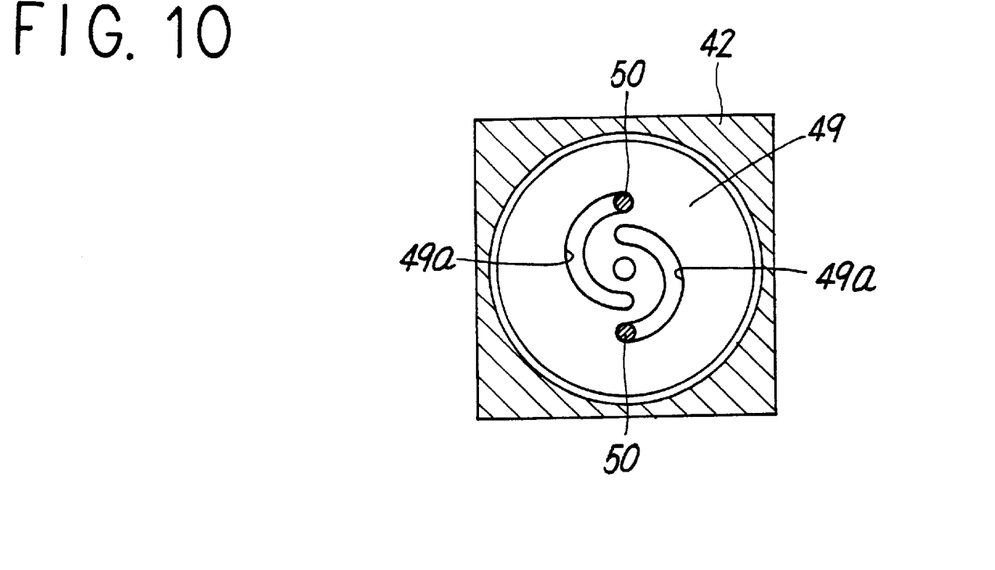
FIG. 10 is a cross-sectional view taken along line B—B in FIG. 7.
Figure 11:
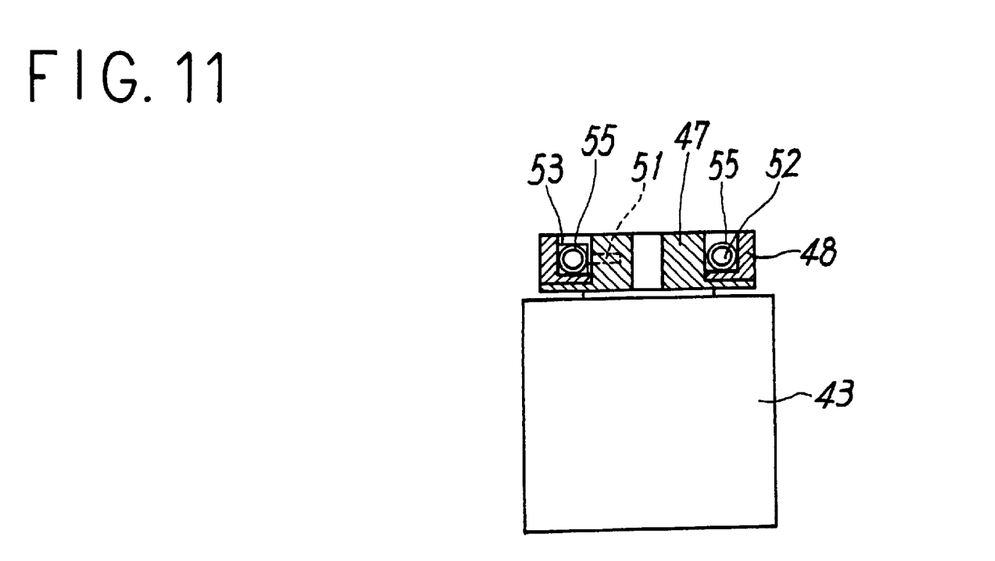
FIG. 11 is a cross-sectional view taken along line C—C in FIG. 9.

Each of the cam grooves 49a is semicircular as shown in FIG. 10, of which the center of curvature is positioned on a straight line passing the rotation center of the cam member 49. Also, the cam grooves 49a occupy positions oppositely biased from each other by the same distance with the aforementioned rotation center therebetween.

Figure 9:
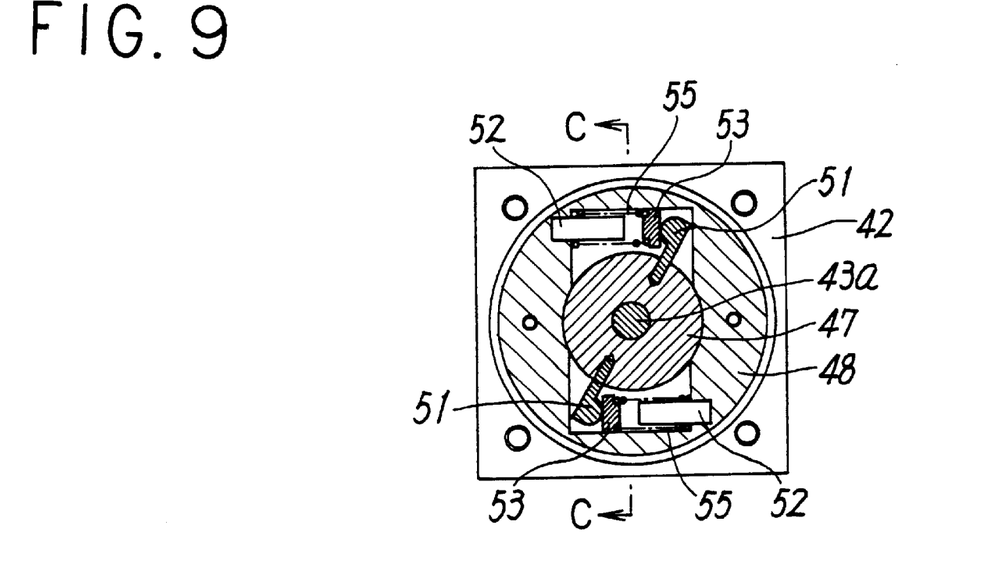
FIG. 9 is a cross-sectional view taken along line A—A in FIG. 7.

As can be seen from FIGS. 7 and 9, the rotation member 46 has a base portion 47 fixed to the output shaft 43a and an mounting stand 48 which is assembled on the base portion 47 so as to be rotatable relative thereto. On the mounting stand 48, the aforementioned cam member 49 is mounted. Levers 51 are provided on the base portion 47. When the base portion 47 is driven to rotate clockwise in the state shown in FIG. 9, the aforementioned levers 51 directly abut on the mounting stand 48. Thereby, the rotation force of the base portion 47 is directly transmitted to the mounting stand 48. On the other hand, when the base portion 47 is driven to rotate counterclockwise, the distal end of each of the levers 51 abuts on a reception member 53 supported in a spring guide 52 via a spring 55 provided in the mounting stand 48. In this configuration, the springs 55 are compressed, and elastic forces thereby generated are used to rotate the mounting stand 48. When each of the springs 55 is compressed by the distal end of the lever 51 via the reception member 53, the spring guide 52 concurrently functions as a stopper that defines a limit of a specific rotation velocity of the lever 51.

Thus, the mounting stand 48 is mounted so as to be rotatable relative to the base portion 47 in the opening/closing direction of the jaw members 44 by the fixed angle. Concurrently, it is assembled in a state of being urged by the spring 55 in the direction so as to cause the jaw members 44 to perform the holding operation. When the mounting stand 48 is driven in the direction so as to cause the jaw members 44 to release the workpiece, it is driven together with the base portion 47. When the workpiece is held, the jaw members 44 are driven via the springs 55, and the state where the workpiece is held is maintained according to the elastic force of the spring 55.

Thus, in the third embodiment, a buffering mechanism is configured of the base portion 47 and the levers 51 which are driving-side members and which operate together with the output shaft 43a, the mounting stand 48 which is a driven-side member and which operates together with the jaw members 44, and the springs 55 interposed therebetween.

Figure 8:
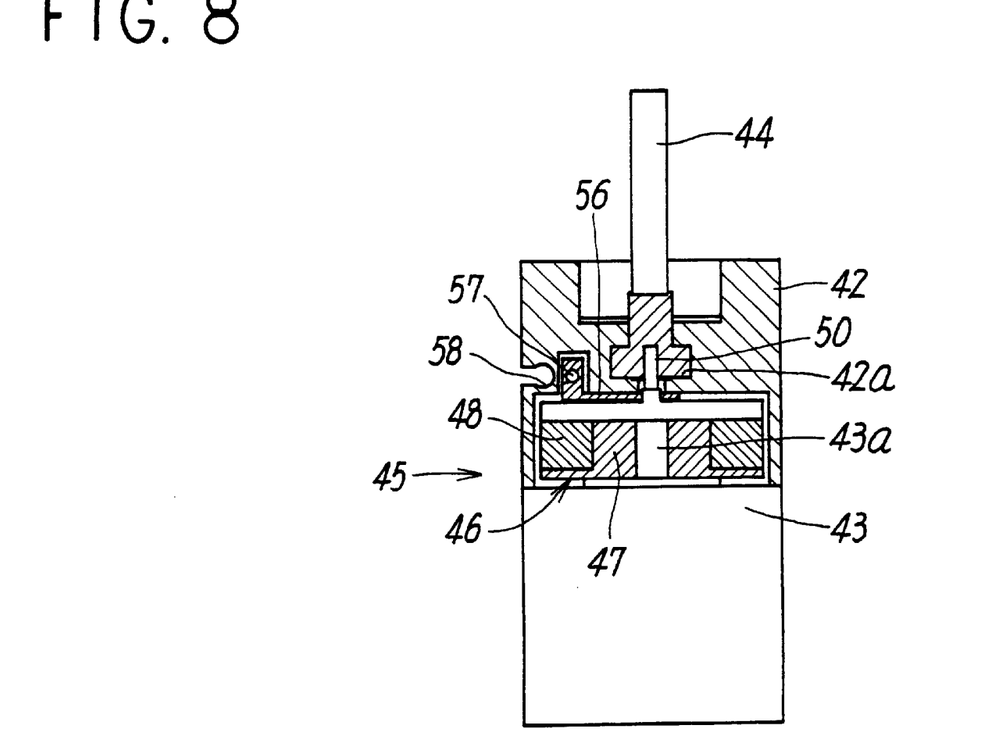
FIG. 8 is a side cross-sectional view of the third embodiment.

In addition, as shown in FIG. 8, the electric hand has a position detecting member 56 for detecting the position of the jaw members 44. The position detecting member 56 is fixed with one of the driving pins 50, and in this state, is arranged to be movable perpendicular to the cross-sectional face in FIG. 8. A position detecting magnet 57 is mounted at the end of the position detecting member 56 so as to be detected by a position detecting sensor arranged in a sensor mounting groove 58 provided in the hand main body 42.

In the electric hand of the third embodiment configured as described above, when a pair of the jaw members 44 are operated to open, the stepping motor 43 is driven to allow the base portion 47 of the rotation member 46 to rotate clockwise in the state shown in FIG. 9. Thereby, the levers 51 function to rotate the mounting stand 48 and the cam member 49 immobilized thereon in the same direction as the base portion 47, and the driving pins 50 individually engaging the cam grooves 49a move toward outer ends of the cam grooves 49a. Thereby, the jaw members 44 are linearly driven in the directions opposing each other to be open. In this case, by setting driving limit of the stepping motor preliminarily, a problem of out-of-synchronism pulses is not caused.

Conversely, which the jaw members 44 are operated to close, the stepping motor 43 is driven in the reverse direction. In this case, the rotation force of the base portion 47 is transmitted to the mounting stand 48 from the levers 51 via the reception members 53 and the springs 55. The rotation of the cam member 49 causes the driving pins 50 to individually move in the cam grooves 49a to their inner ends, thereby allowing the jaw members 44 to perform the closing motion. Even after the jaw members 44 hold the workpiece, the base portion 47 is slightly rotated by driving the stepping motor 43 in the direction so as to cause the jaw members 44 to perform the close motion. However, the slight rotation is absorbed by the spring 55, and the state where the jaw members 44 hold the workpiece is therefore maintained. When the jaw members 44 hold the workpiece, although the mounting stand 48 is not allowed to rotate further, the spring 55 allows the base portion 47 to rotate by a specific angle until the reception members 53 abut on the edges of the spring guides 52. Therefore, in the given range, the stepping motor 43 runs without causing a problem of out-of-synchronism with pulses.

Thus, according to preliminarily setting of the number of pulses for driving the stepping motor 43 to a range in which the spring 55 is compressed, the workpiece can be securely held without an operational defect being caused due to out-of-synchronism with pulses.

According to the above-described electric hand of each of the embodiments, while the stepping motor is used, the operational defects due to out-of-synchronism with pulses, the holding width of the jaw members that corresponding to the workpiece can be secured, and the workpiece can therefore be held.

What is claimed is:

1. An electric hand comprising:
   a pair of jaw members arranged to perform opening/closing motion for holding a workpiece; a stepping motor whose rotation quantity is controlled according to the number of driving pulses; a converting mechanism for converting reciprocating and rotating motion of an output shaft of the stepping motor to opening/closing motion of the jaw members; and a buffering mechanism for over-rotating the stepping motor in a buffered manner within a preset range of the number of pulses at workpiece-holding operation of the jaw members,
   wherein the buffering mechanism comprises a driving-side member which operates together with the output shaft, a driven-side member which operates together with the jaw members, and spring means interposed between the driving-side member and the driven-side member, and the driving-side member is directly engaged with the driven-side member to allow a driving force to be directly transmitted from the output shaft to the jaw members at opening motion of the jaw members, while the driving-side member is engaged with the driven-side member via the spring means to allow the driving force to be elastically transmitted from the output shaft to the jaw members via the spring means at workpiece-holding operation of the jaw members.

2. An electric hand according to claim 1, wherein the converting mechanism comprises:

a rotation shaft that is installed on the output shaft of the stepping motor and that has a screw portion at an end portion, a driving member that is screw-connected with the screw portion of the rotation shaft and that is linearly moved forward and backward along the axial direction according to reciprocating and rotating motion of the rotation shaft, and an opening/closing mechanism for converting linear movement transmitted from the driving member to the opening/closing motion of the pair of jaw members via a transmission shaft, wherein the spring means is interposed between the driving member and the transmission shaft, and the buffering mechanism is configured of the driving member, the transmission shaft, and the spring means.

3. An electric hand according to claim 2, wherein the driving member comprises a hollow buffer housing on a distal end side, a proximal end portion of the transmission shaft is housed in the buffer housing so as to be slidable by a specific distance, and the spring means is interposed between a flange portion formed on the transmission shaft and the buffer housing so as to elastically urge the transmission shaft in the backward direction.

4. An electric hand according to claim 2, wherein the opening/closing mechanism comprises a pair of substantially L-shaped levers, the levers are provided such that their intermediate sections are rotatably supported by pins, their end portions are engaged with the jaw members, and their proximal end portions are engaged with an end portion of the transmission shaft; and the pair of levers are rotated according to forward and backward motions of the transmission shaft to allow the pair of jaw members to perform the opening/closing motion.

5. An electric hand according to claim 1, wherein the converting mechanism comprises:

a pinion mounted on the output shaft of the stepping motor, a pair of driving members that are arranged symmetrical so as to sandwich the pinion and that have racks formed so as to be respectively engaged with the pinion, and a transmission members respectively provided between the driving members and the jaw members for transmitting motion of the driving members to the jaw members to allow the pair of jaw members to perform the opening/closing motion, wherein the spring means is interposed between the driving members and the transmission members, and the buffering mechanism is formed of the driving members, the transmission members, and the spring means.

6. An electric hand according to claim 5, wherein the transmission members are individually housed in the driving members that are cylindrical so as to be slidable by a specific distance and are connected to the jaw members via driving pins extending from the transmission members, and the spring means is interposed between the transmission members and the driving members so as to elastically urge the transmission members in the direction for holding operation.

7. An electric hand according to claim 1, wherein the converting mechanism comprises:

a rotation member mounted on the output shaft of the stepping motor; a cam member mounted on the rotation member; a pair of substantially semicircular cam grooves that are formed in the cam member; and driving pins that are installed on the pair of jaw members, that are individually engaged into the pair of cam grooves, and that slide in the pair of cam grooves according to rotation of the cam member to allow the jaw members to perform the opening/closing motion, and the rotation member comprises a base portion fixed on the output shaft, and an mounting stand installed on the base portion so as to be relatively rotatable by a specific angle; the cam member is installed on the mounting stand; the spring means is interposed between the base portion and the mounting stand; and the buffering mechanism is configured of the base portion, the mounting stand, and the spring means.

8. An electric hand according to claim 7, wherein the base portion of the rotation member comprises levers, the mounting stand comprises the spring means and spring receivers, the levers directly abut on the mounting stand to allow a rotation force of the base portion to be directly transmitted to the mounting stand when the base portion rotates in one direction, and the levers abut on the mounting stand via the spring receivers to allow the rotation force of the base portion to be elastically transmitted to the mounting stand via the spring means when the base portion rotates in the reverse direction.

* * * * *